(12) United States Patent
Doi (10) Patent No.: US 8,810,510 B2
(45) Date of Patent: Aug. 19, 2014

(54) CURSOR DISPLAY METHOD AND CHARACTER INPUT APPARATUS

(75) Inventor: Shinobu Doi, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 306 days.

(21) Appl. No.: 13/176,420

(22) Filed: Jul. 5, 2011

(65) Prior Publication Data

US 2012/0007802 A1    Jan. 12, 2012

(30) Foreign Application Priority Data

Jul. 9, 2010   (JP) .................................. 2010-156798

(51) Int. Cl.
G06F 3/03     (2006.01)

(52) U.S. Cl.
USPC .......................................... 345/157; 715/264

(58) Field of Classification Search
USPC ............................ 345/157; 715/234, 264, 765
See application file for complete search history.

(56) References Cited

U.S. PATENT DOCUMENTS

| 5,687,386 | A | 11/1997 | Niimura | |
|---|---|---|---|---|
| 6,415,305 | B1 * | 7/2002 | Agrawal et al. | 715/232 |
| 7,398,468 | B2 * | 7/2008 | Flam | 715/264 |

FOREIGN PATENT DOCUMENTS

| EP | 0 144 657 A2 | 6/1985 | | |
|---|---|---|---|---|
| FR | 2 570 536 A1 | 3/1986 | | |
| WO | WO 01/38957 | * | 5/2001 | ............... G06F 3/00 |
| WO | WO 01/38957 A2 | 5/2001 | | |

OTHER PUBLICATIONS

European Search Report for corresponding EP Application No. 11 16 6247, dated Sep. 16, 2011, 16 pages.
Allouche M et al.: "Guidelines of a Logical User Interface for Editing Bidirectional Text," Internet Citation, dated Mar. 20, 2002, 20 pages.
Ishida R: "What you need to know about the Bidi Algorithm and Inline Markup," Internet Citation, dated Dec. 3, 2006, 12 pages.

* cited by examiner

*Primary Examiner* — Andrew Sasinowski
(74) *Attorney, Agent, or Firm* — Brinks Gilson & Lione (57) ABSTRACT

When an input mode is switched from input of a first-type character written in a first character input direction into input of a second-type character written in a second character input direction opposite to the first character input direction, a displayed cursor is moved in the second character input direction in response to progression of input of second-type characters. At that time, first display-position movement processing is performed so that a display position of each character input before the switching is moved in the second character input direction in response to the progression of input of second-type characters with a display position of a second-type character input after the switching being fixed.

18 Claims, 4 Drawing Sheets

CURSOR DISPLAY METHOD AND CHARACTER INPUT APPARATUS

RELATED APPLICATIONS

The present application claims priority to Japanese Patent Application Serial Number 2010-156798, filed Jul. 9, 2010, the entirety of which is hereby incorporated by reference.

BACKGROUND OF THE INVENTION

1. Field of the Invention

The present invention relates generally to cursor display methods and character input apparatuses. More particularly, the present invention relates to cursor display methods and character input apparatuses suitable for inputting a character string comprising a mixture of first-type characters having a first writing direction and second-type characters having a second writing direction opposite to the first writing direction in a character input area capable of displaying a limited number of characters.

2. Description of the Related Art

Some apparatuses having a character input function support input of a character string comprising a mixture of characters that are written in opposite directions depending on character types, such as alphabets and numerals in Arabic.

As the related art for inputting a character string of this kind, a technique for inputting a character string containing a mixture of Arabic alphabets and Latin alphabets is known as disclosed in Japanese Unexamined Patent Application Publication Nos. 60-115987, 01-205262, 05-119755, and 07-230451.

For example, in Japanese Unexamined Patent Application Publication No. 60-115987, a write-position indicator is moved from right to left to receive character input according to a writing direction of Arabic alphabets (right-to-left horizontal writing) when users input the Arabic alphabets. When the users continuously input Latin alphabets after inputting such Arabic alphabets, the input Latin alphabets are moved in the left direction in order of input with the write-position indicator being fixed, so that character input according to a writing direction of Latin alphabets (left-to-right horizontal writing) is received. In this way, input of a character string containing a mixture of Arabic alphabets and Latin Alphabets is permitted.

Since applications and devices dedicated to character input, such as word processing software and a word processor for use in personal computers (PCs), can begin a new line to display characters exceeding a limit of one input line on the next line when users input one or more lines of characters, the users can confirm a character input immediately before the latest one with their eyes.

In contrast, devices, such as in-vehicle devices, display a character input field limiting a number of displayable characters on a display unit and receive characters input in the character input field. In such devices, users may be unfortunately unable to confirm a character input immediately before the latest one.

More specifically, when a character string having a constant writing direction is input in a character input field, the input characters overflow from the character input field and are hidden in order of input as the character input progresses. Accordingly, the foregoing problem does not occur.

Figure 4:
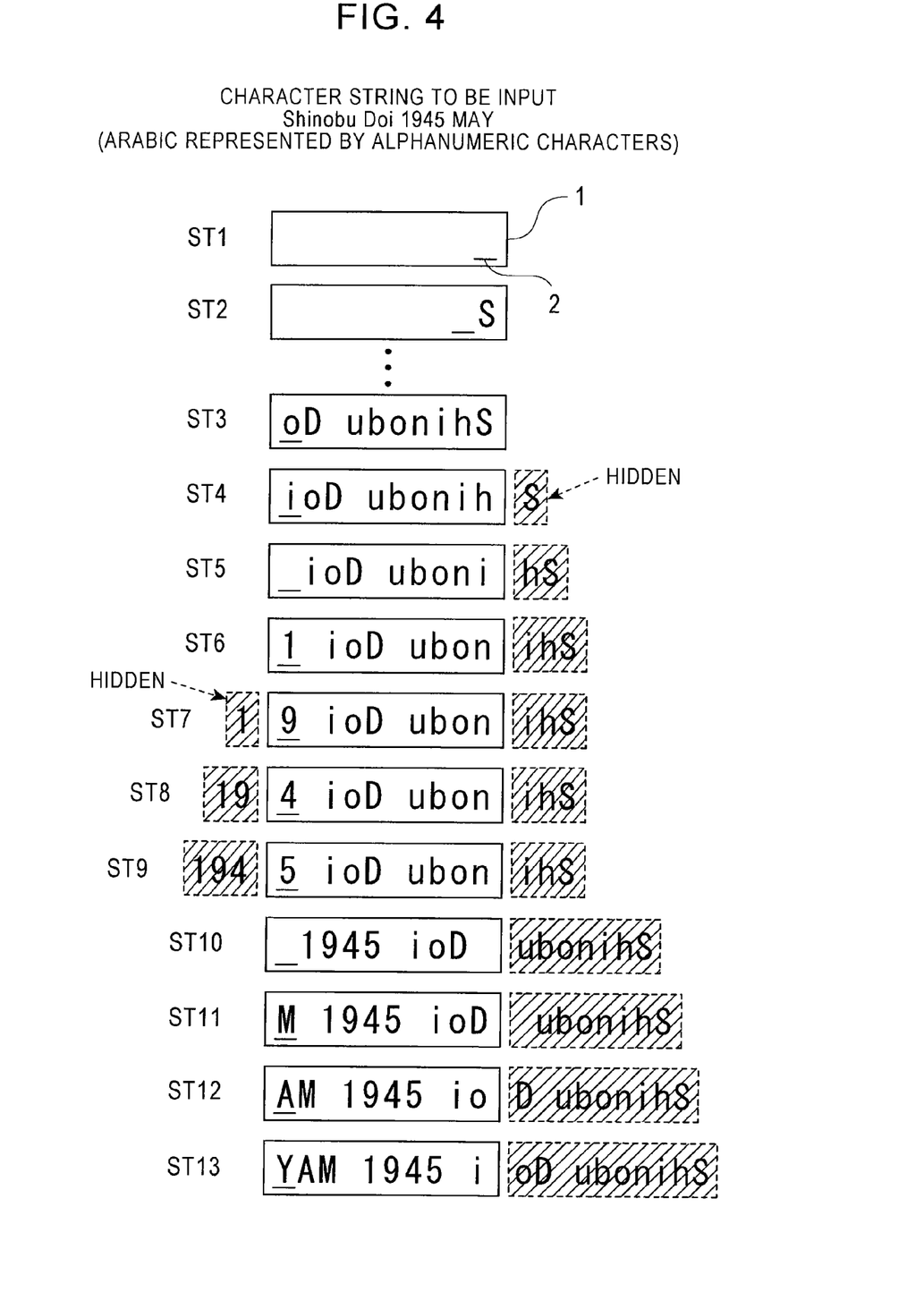
FIG. 4 is a process chart illustrating a cursor display method according to the related art.

In contrast, the problem occurs when a character string containing a mixture of characters written in opposite directions are input in a character input field 1 as illustrated in FIG. 4.

FIG. 4 is a process chart illustrating a case of inputting an Arabic character string in the character input field 1 capable of displaying up to ten characters in order from step 1 (ST1) to step 13 (ST13). Referring to FIG. 4, Arabic characters are represented as alphanumeric characters with writing directions being adapted to Arabic ones for convenience. Latin alphabets represent characters (alphabets) in Arabic, whereas Arabic numerals represent numerals in Arabic. Additionally, illustration of steps existing between step 2 (ST2) and step 3 (ST3) is omitted in FIG. 4 for convenience. Furthermore, a blank space (i.e., a space) representing character spacing between alphabets or between an alphabet and a numeral in Arabic is included in the alphabets because the space has the same writing direction as the alphabets.

Based on such an assumption, a character string "Shinobu Doi 1945 MAY" (translated into English) constituted by 20 characters (including spaces) is to be input in the character input field 1.

As illustrated in FIG. 4, in step 1 (ST1) to step 5 (ST5), alphabets (including a space) in Arabic (hereinafter, referred to as Arabic alphabets) are input in the character input field 1 in a left direction corresponding to a writing direction of the Arabic alphabets. At this time, a cursor 2 indicating an input position of a next Arabic alphabet is also moved in the left direction from an initial display position illustrated in step 1 (ST1) as the input of Arabic alphabets progresses.

However, when the cursor 2 is moved to a left end display position of the character input field 1 as illustrated in step 3 (ST3), i.e., when the cursor 2 can be moved in the left direction no more, the display position of each of the Arabic alphabets input before the latest one is then moved in a right direction as the input of Arabic alphabets progresses with the display position of the cursor 2 being fixed as illustrated in step 4 (ST4). As a result of such movement of the display position, the Arabic alphabet "S" that has been displayed in step 3 (ST3) overflows from the character input field 1 and is hidden in step 4 (ST4).

The movement of the display position of each of the input Arabic alphabets similar to that in step 4 (ST4) is further performed twice in a row from step 4 (ST4) so that the number of times of the movement is equivalent to the number of alphabets input until an input mode is switched from the Arabic alphabets to the numerals.

After the input mode is switched from the Arabic alphabets to the numerals in step 6 (ST6), numerals are input in the right direction corresponding to a writing direction of numerals in step 6 (ST6) to step 9 (ST9). Unlike the case of inputting Arabic alphabets, the display position of the cursor 2 is fixed regardless of progression of input of numerals. Instead, a display position of each of the numerals input before the latest one is moved in the left direction.

At this time, display states of numerals in step 7 (ST7) to step 9 (ST9) may be problematic.

More specifically, a numeral "9" following a numeral "1" having been input in step 6 (ST6) is input in step 7 (ST7). At this time, since the earlier input numeral "1" overflows from the character input field 1 and is hidden as a result of moving the numeral in the left direction, there is no way for users to confirm the numeral "1". This similarly applies to step 8 (ST8) and step 9 (ST9).

Such a problem regarding difficulty in confirming a character input immediately before the latest one has to be solved as soon as possible since the problem often induces overlooking of input mistakes, such as those in inputting an address (e.g., a house number) and in edition of a phone book or a title of a song.

SUMMARY OF THE INVENTION

Accordingly, the present invention has been made in view of such a problem and provides cursor display methods and character input apparatuses that allow users to confirm a character input immediately before the latest one when the users input a character string containing a mixture of characters having opposite writing directions. Accordingly, the disclosed cursor display methods and character input apparatus may assist in preventing input mistakes from being overlooked.

To this end, in one aspect, a cursor display method is disclosed for inputting a character string comprising a mixture of a first-type character having a first writing direction and a second-type character having a second writing direction opposite to the first writing direction in a character input area capable of receiving input of characters and displaying a limited number of input characters. The cursor display method includes the steps of: moving, when the first-type character is input in the character input area in a first character input direction corresponding to the first writing direction, a displayed cursor indicating an input position of a next character in the character input area in the first character input direction in response to progression of input of first-type characters so that the displayed cursor indicates the input position of the next first-type character; and moving, when input of the first-type character is switched into input of the second-type character written in a second character input direction opposite to the first character input direction, the displayed cursor in the second character input direction in response to progression of input of second-type characters so that the displayed cursor indicates the input position of the next second-type character and performing first display-position movement processing so that a display position of each character input before the switching is moved in the second character input direction in response to the progression of input of second-type characters with a display position of the second-type character input after the switching being fixed.

Additionally, in another aspect, a character input apparatus is disclosed that is capable of inputting a character string comprising a mixture of a first-type character having a first writing direction and a second-type character having a second writing direction opposite to the first writing direction in a character input area. The character input apparatus includes: a display unit; a character-input-area display processing device configured to display the character input area capable of receiving input of characters and displaying a limited number of input characters on the display unit; an operation device capable of receiving an operation for inputting a character in the character input area displayed by the character-input-area display processing device; a character-input display processing device configured to input and display a character corresponding to the operation of the operation device in the character input area; a cursor display processing device configured to display, in the character input area, a cursor indicating an input position of a next character in the character input area; and a display-position movement processing device capable of moving a display position of the character input and displayed by the character-input display processing device in response to progression of input of characters. When the first-type character is input in the character input area in a first character input direction corresponding to the first writing direction, the cursor display processing device moves the displayed cursor in the first character input direction in response to progression of input of first-type characters so that the cursor indicates the input position of the next first-type character. When input of the first-type character is switched into input of the second-type character written in a second character input direction opposite to the first character input direction, the cursor display processing device moves the displayed cursor in the second character input direction in response to progression of input of second-type characters so that the cursor indicates the input position of the next second-type character. The display-position movement processing device performs first display-position movement processing when the displayed cursor is moved in the second character input direction so that a display position of each character input before the switching is moved in the second character input direction in response to the progression of input of second-type characters with the display position of the second-type character input after the switching being fixed.

In accordance with these aspects of the present invention, the displayed cursor can be moved in the first character input direction as the input of the first-type character progresses when the first-type character is input. When an input mode is switched from the first-type character to the second-type character, the displayed cursor can be moved in the second character input direction as the input of the second-type character progresses and the first display-position movement processing can be performed with the display position of the second-type character input after the switching being fixed. Thus, users can confirm a character input immediately before the latest one with their eyes when inputting the character string containing the mixture of the first-type character and the second-type character in the character input area.

A character overflowing from the character input area as a result of the first display-position movement processing may be hidden.

Additionally, the display position of each character input before the switching may be moved in the first display-position movement processing by an amount equivalent to the number of the input second-type characters. Such a configuration allows the users to confirm as many characters input before the switching as possible in the character input field.

Furthermore, the displayed cursor may be moved in the second character input direction and the first display-position movement processing may be performed when the switching is performed at an end input position of the character input area in the first character input direction. When the switching is performed at an input position other than the end input position, the display position of the cursor may be fixed regardless of the progression of input of second-type characters and second display-position movement processing may be performed so that the display position of the second-type character input earlier after the switching is moved in the first character input direction in response to the progression of input of second-type characters with the display position of the character input before the switching being fixed. With such a configuration, a blank part of the character input area remains in the first character input direction with respect to the latest input character when the input mode is switched from the first-type character in the second-type character at the input position short of the end input position of the character input area in the first character input direction. Thus, this blank part can be advantageously utilized in display and movement of the second-type character input earlier after the switching.

However, even when the second display-position movement processing is performed with the display position of the cursor and the display position of the character input before the switching being fixed, the displayed cursor may be moved in the second character input direction and the first display-position movement processing may be performed in response to the progression of input of second-type characters after the second-type character input at the time of the switching is moved to the end input position of the character input area in the first character input direction in process of performing the second display-position movement processing. With such a configuration, the second-type character input after the switching can be preferentially held in the character input area by switching into the movement of the displayed cursor in the second character input direction and the first display-position movement processing when the blank part of the character input area no longer remains.

Furthermore, when a latest second-type character input after the switching is displayed at the end display position of the character input area in the second character input direction in process of moving the displayed cursor in the second character input direction and performing the first display-position movement processing, the display position of the cursor may be fixed thereafter regardless of the progression of input of second-type characters and the second display-position movement processing may also be performed so that the display position of the second-type character input earlier after the switching is moved in the first character input direction in response to the progression of input of second-type characters. With such a configuration, the second-type character input after the switching can be preferentially held in the character input area from the newly input side by performing the second display-position movement processing with the display position of the cursor being fixed when the displayed cursor can be no longer moved in the second character input direction and the first display-position movement processing can be no longer performed.

Additionally, when input of the second-type character is now switched into input of the first-type character after the switching, the displayed cursor may be moved at a display position indicating an input position of a first-type character following the one input at the time of the last switching. With such a configuration, the input position of the following first-type character can be indicated by the cursor when the input mode is switched from the second-type character to the first-type character.

Furthermore, the character string may be in a predetermined language in which characters are written in opposite directions depending on types of the characters. With such a configuration, the users can confirm the character input immediately before the latest one in the character input area when inputting a character string of the predetermined language.

Arabic may serve as the predetermined language. An alphabet in Arabic may correspond to the first-type character, whereas a numeral in Arabic may correspond to the second-type character. With such a configuration, the users can confirm the character input immediately before the latest one in the character input area when inputting an Arabic character string.

Additionally, the aspects of the present invention may be applied to input of characters in in-vehicle devices.

The aspects of the present invention allow users to confirm a character input immediately before the latest one when the users input a character string of a mixture containing characters having opposite writing directions and, thus, can prevent input mistakes from being overlooked.

DESCRIPTION OF THE PREFERRED EMBODIMENTS

Cursor Display Method According to a First Embodiment

One embodiment of a cursor display method will be described below with reference to FIG. 1. Contents that are the same as or similar to those illustrated in FIG. 4 will be described using similar references.

Figure 1:
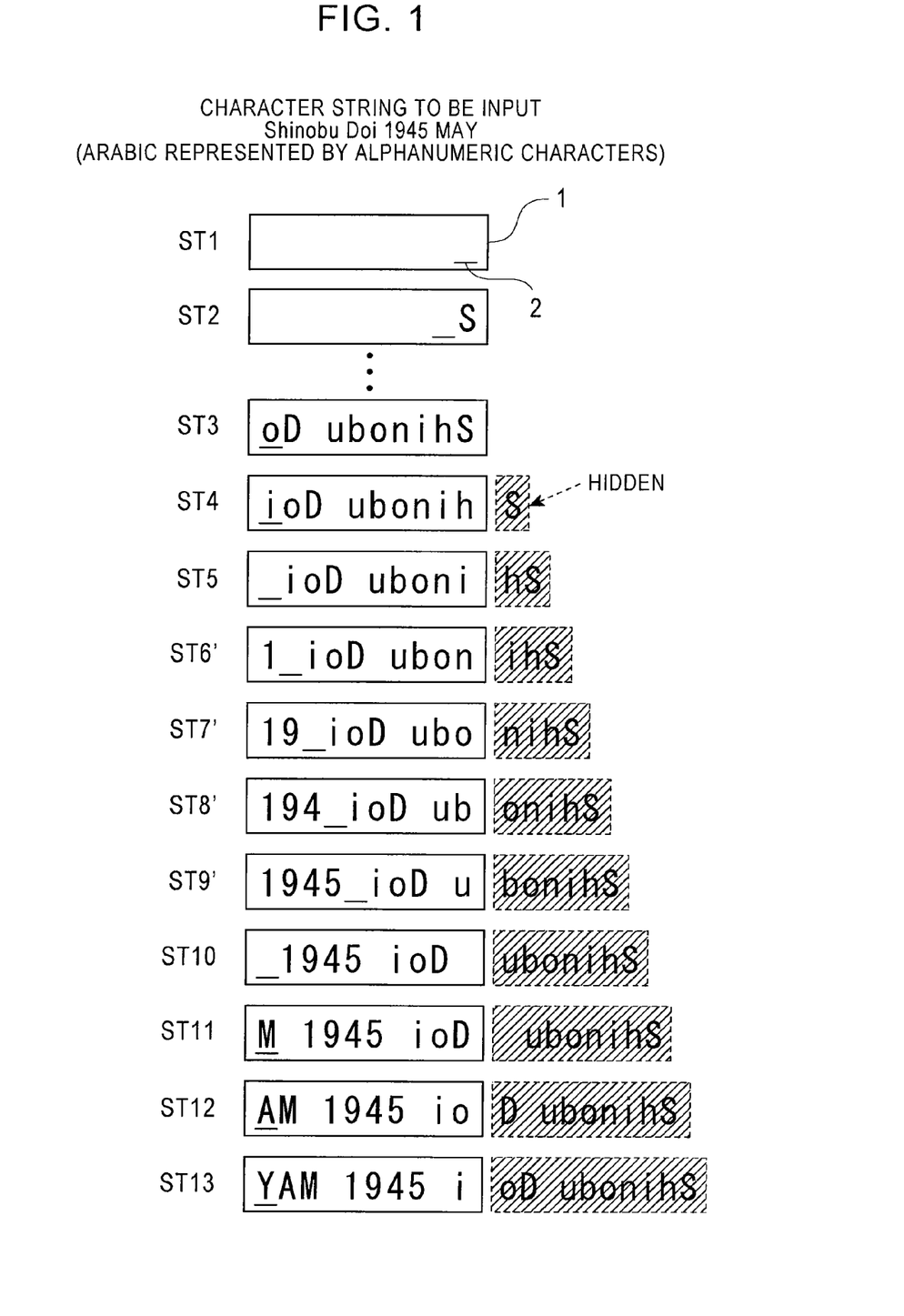
FIG. 1 is a process chart illustrating a cursor display method according to a first embodiment of the present invention.

FIG. 1 is a process chart illustrating a case of inputting characters in a character input field 1 serving as a character input area using a cursor display method. Similarly to the character input field illustrated in FIG. 4, the character input field 1 is an area in which characters can be input and a limited number of input characters can be displayed. Although the number of characters displayable in the character input field 1 is set equal to ten (spaces included) in FIG. 1 similarly to FIG. 4, the present invention should not be limited to such an example.

Such a character input field 1 may be displayed on a display unit of in-vehicle devices (e.g., car-navigation systems). Additionally, characters may be input in the character input field 1 through operations of operation units, such as a touch panel or a remote control.

As illustrated in FIG. 1, a character string containing a mixture of Arabic alphabets and Arabic numerals is input in the character input field 1. The Arabic alphabets serve as first-type characters having a first writing direction, i.e., a right-to-left writing direction, whereas the Arabic numerals serve as second-type characters having a second writing direction, i.e., a left-to-right writing direction. That is, in this embodiment, an Arabic character string is input in the character input field 1 similarly to FIG. 4.

Although an Arabic character string "Shinobu Doi 1945 MAY" (translated into English) constituted by 20 characters (spaces included) is to be input in the character input field 1 in FIG. 1 similarly to FIG. 4, the present invention should not be limited to such an example.

In some implementations, a cursor 2 is displayed in a manner illustrated in step 1 (ST1) to step 5 (ST5) when Arabic alphabets (including a space) are input in the character input field 1 in a left direction in FIG. 1 for inputting the Arabic character string "Shinobu Doi 1945 MAY". The left direction serves as a first character input direction corresponding to a writing direction of Arabic alphabets.

Each of step 1 (ST1) to step 5 (ST5) is similar to that illustrated in FIG. 4 and details thereof are already described. An initial display position of the cursor 2 illustrated in step 1 (ST1) may be set when Arabic is set as a character input language in character input apparatuses, such as in-vehicle devices.

Unlike step 6 (ST6) to step 9 (ST9) illustrated in FIG. 4, processing illustrated in step 6' (ST6') to step 9' (ST9') may be performed after step 5 (ST5).

More specifically, in response to switching from an Arabic-alphabet input mode into an input mode of numerals that are input in a right direction of FIG. 1 in step 6' (ST6'), the cursor 2 is moved in the right direction as input of numerals progresses so that the cursor 2 indicates an input position of a next numeral. This movement is continued until step 9' (ST9'), during which input of numerals is continued. The right direction corresponds to a second character input direction.

Additionally, at this time, first display-position movement processing is performed so that the display position of each of the characters input before the switching is moved in the right direction as the input of numerals progresses with the display positions of the numerals ("1", "9", "4", and "5" in FIG. 1) input after the switching, i.e., after step 6' (ST6'), being fixed. Referring to FIG. 1, the characters input before the switching constitute a character string containing Arabic alphabets and a space.

In addition, at this time, characters overflowing from the character input field 1 as a result of the first display-position movement processing are hidden. More specifically, an Arabic alphabet "n" having been displayed in step 6' (ST6') immediately after the switching is hidden in step 7' (ST7'). Similar hiding processing is performed in step 8' (ST8') and step 9' (ST9').

Furthermore, as indicated by step 7' (ST7') to step 9' (ST9'), the display position of each of the characters input before the switching is moved in the first display-position movement processing by an amount equivalent to the number of input numerals.

When the input mode is then switched into the Arabic-alphabet input mode after step 9' (ST9'), the process shifts into processing starting from step 10 (ST10) similarly to FIG. 4.

More specifically, in step 10 (ST10), the input mode is switched from input of numerals into input of Arabic alphabets (spaces are included in Arabic alphabets in FIG. 1). At this time, the cursor 2 indicating an input position of a numeral following the latest input numeral ("5" in FIG. 1) in step 9' (ST9') is moved to a display position indicating the input position of an Arabic alphabet following the one (the space) input in step 10 (ST10). Referring to FIG. 1, the cursor 2 is moved to the left end input position (the display position) of the character input field 1.

After step 11 (ST11), the users input the remainder of the Arabic alphabets until step 13 (ST13) to complete inputting the character string.

If the input mode is again switched into the numeral input mode after step 10 (ST10), which differs from the example of the character string to be input in FIG. 1, processing similar to step 6' (ST6') to step 9' (ST9') may be performed on numerals input after the switching.

As described above, the cursor 2 can be moved in the left direction in response to progression of input of Arabic alphabets when the Arabic alphabets are input. When the input mode is switched into the numeral input mode, the cursor 2 can be moved in the right direction and the first display-position movement processing can be performed with the display position of each of the numerals input after the switching being fixed as the character input progresses. In this way, users can confirm a character input immediately before the latest one in the character input field 1 with their eyes when inputting a character string containing a mixture of Arabic alphabets (including a space) and numerals in the character input field 1. Additionally, the users can confirm as many characters input before the switching as possible in the character input field 1.

Cursor Display Method According to a Second Embodiment

A second embodiment of a cursor display method will now be described with reference to FIG. 2 based on differences from the embodiment described above with reference to FIG. 1. Contents that are the same as or similar to those illustrated in FIG. 1 will be described using similar references.

Figure 2:
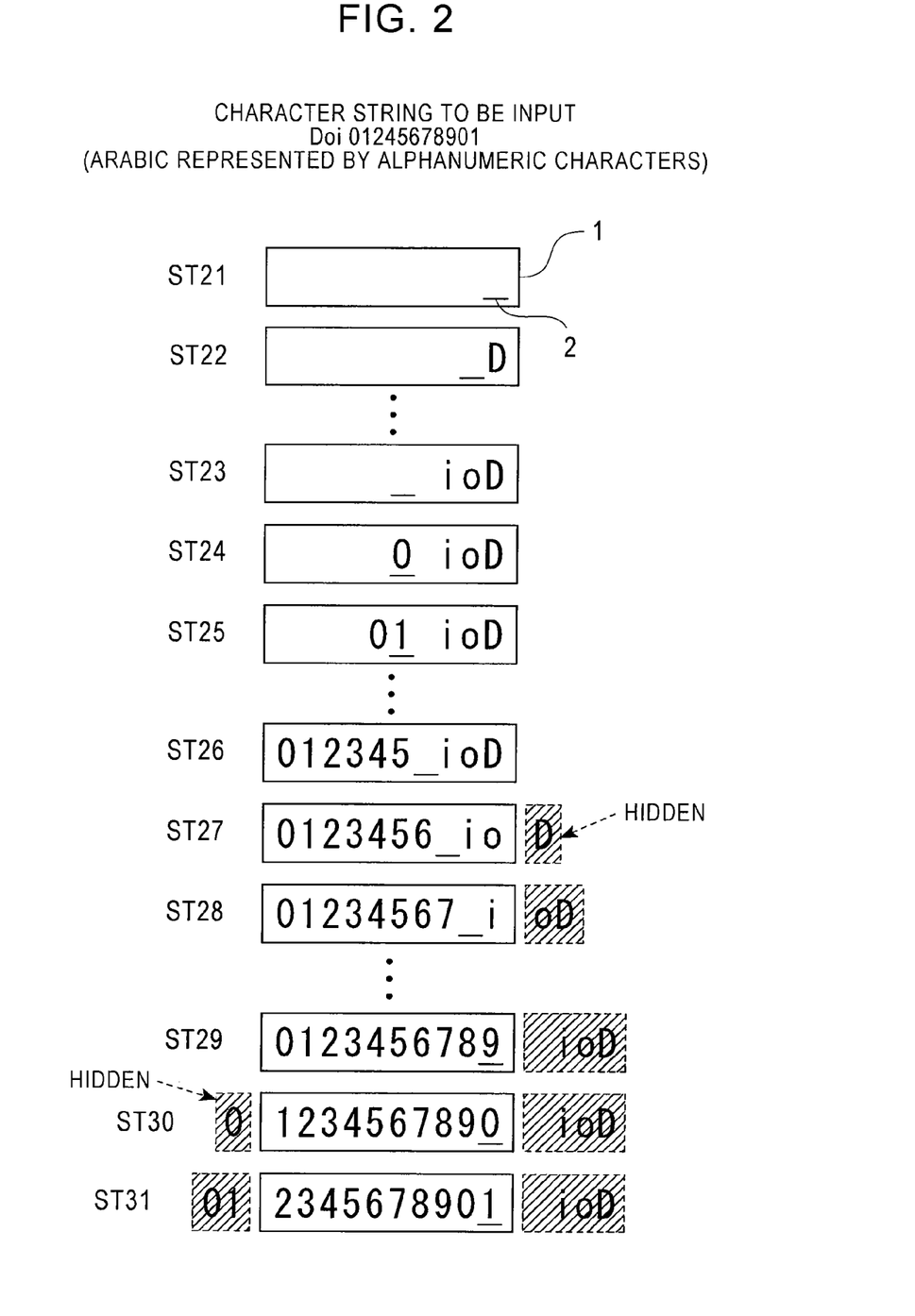
FIG. 2 is a process chart illustrating a cursor display method according to a second embodiment of the present invention.

FIG. 2 is a process chart illustrating a case of inputting characters in a character input field 1 serving as a character input area using the second embodiment of the cursor display method.

Unlike the first embodiment, an Arabic character string "Doi 012345678901" (translated into English) is input in the character input field 1 in this embodiment. However, the character string to be input is not necessarily limited to such a character string. Any character string can be advantageously adopted in the embodiment as long as an input mode is switched into a numeral input mode before an input Arabic alphabet reaches a left end input position of the character input field 1 and the character string contains a numeral string exceeding a number of characters displayable in the character input field 1.

In the embodiment, input of Arabic alphabets is started toward a left end of the character input field 1 from an initial state illustrated in step 21 (ST21) in FIG. 2. The input of Arabic alphabets (including a space) progresses and a cursor 2 is moved in the left direction in response to the input until step 23 (ST23). For convenience, illustration of steps between step 22 (ST22) and step 23 (ST23) is omitted. These steps are generally similar to step 1 (ST1) to step 3 (ST3) in the first embodiment.

In step 24 (ST24), an Arabic-alphabet input mode is switched into the numeral input mode. A position of this switching differs from that of the first embodiment and is on this side (on a right side) of the left end input position of the character input field 1.

In step 24 and the following steps, the numerals are input in the right direction. Unlike step 6' (ST6') to step 9' (ST9') in the first embodiment, a display position of the cursor 2 is fixed regardless of the progression of input of numerals until step 26 (ST26). Additionally, second display-position movement processing is performed at that time so that a display position of each numeral input earlier after the switching is moved in the left direction as the input of the numerals progresses with the display position of each alphabet input before the switching, i.e., before step 24 (ST24), being fixed. Illustration of steps between step 25 (ST25) and step 26 (ST26) is omitted for convenience.

In step 26 (ST26), the numeral input at the time of the switching (i.e., "0" in FIG. 2) is moved to the left end display position of the character input field 1 in the process of performing such second display-position movement processing.

If the second display-position movement processing is continued after step 26 (ST26), the numerals input after the switching are undesirably hidden in order of input.

Accordingly, in step 27 (ST27) to step 29 (ST29), the cursor 2 is moved in the right direction and the first display-position movement processing is performed in response to progression of input of numerals as in step 6' (ST6') to step 9' (ST9') in the first embodiment. Illustration of steps between step 28 (ST28) and step (ST29) is omitted for convenience.

In step 29 (ST29), a latest numeral input after the switching (i.e., "9" in FIG. 2) is displayed at a right end display position of the character input field 1 in process of moving the cursor 2 in the right direction and performing the first display-position movement processing.

Since the cursor 2 can be moved in the right direction no more in this case, the second display-position movement processing similar to the one performed in step 24 (ST24) to step 26 (ST26) is performed with the display position of the cursor 2 being fixed regardless of the progression of input of numerals in a following step and a last step, i.e., step 30 (ST30) and step 31 (ST 31).

As described above, when the input mode is switched into the numeral input mode before the input position reaches the left end input position of the character input field 1 as in step 24 (ST24), a blank part remains at that time in the character input field 1 on the left side of the latest input alphabet. Accordingly, the blank area can be advantageously utilized in moving the numerals input earlier after the switching in step 24 (ST24) to step 26 (ST26) in accordance with the embodiment.

Additionally, when the blank area no longer remains as in step 26 (ST26), the string of the numerals input earlier after the switching can be held in the character input field 1 preferentially to the Arabic alphabets input before the switching in the processing of step 27 (ST27) to step 29 (ST29).

Furthermore, when the cursor 2 can be moved in the right direction no more as in step 29 (ST29), the numerals having the late input order (i.e., newly input numerals) can be preferentially held in the character input field 1 in step 30 (ST30) and step 31 (ST31).

Character Input Apparatus According to a Third Embodiment

An embodiment of a character input apparatus will now be described with reference to FIG. 3. Contents that are the same as or similar to those illustrated in FIGS. 1 and 2 will be described using similar references.

A character input apparatus 5 is generally capable of performing the foregoing cursor display methods according to the first and second embodiments.

Figure 3:
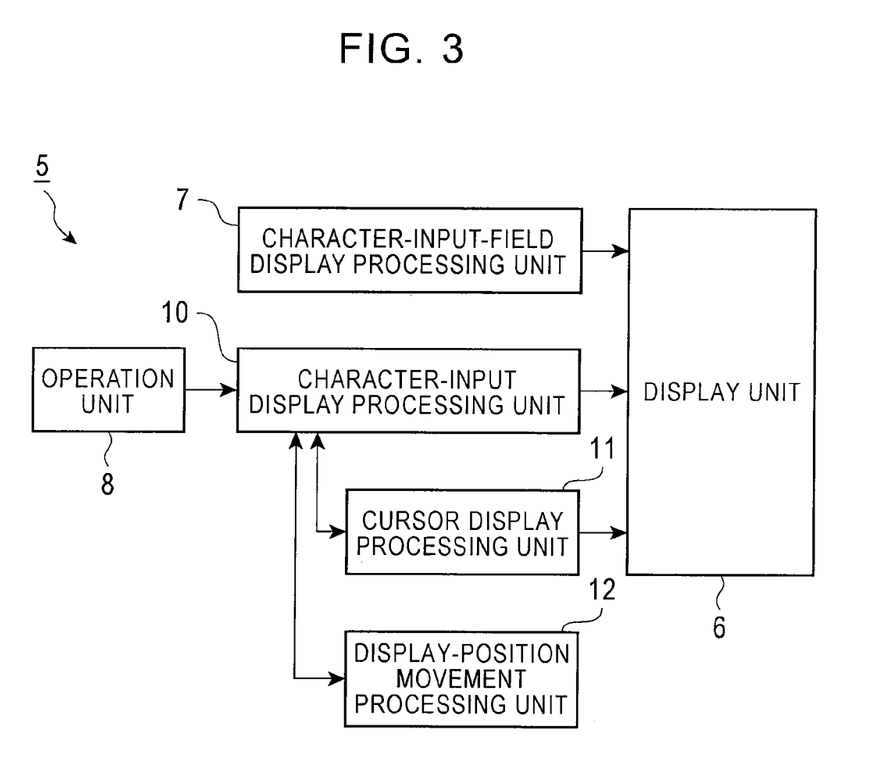
FIG. 3 is a block diagram illustrating a character input apparatus according to a third embodiment of the present invention.

More specifically, as illustrated in FIG. 3., the character input apparatus 5 includes a display unit 6, a character-input-field display processing unit 7 serving as a character-input-area display processing device, and an operation unit 8 serving as an operation device. The character input apparatus 5 also includes a character-input display processing unit 10 serving as a character-input display processing device, a cursor display processing unit 11 serving as a cursor display processing device, and a display-position movement processing unit 12 serving as a display-position movement processing device.

The character-input-field display processing unit 7 displays the above-described character input field 1 on the display unit 6. The character-input-field display processing unit 7 may display this character input field 1 once shifting into an alphabet input mode is instructed through an operation of a menu with the operation unit 8.

The operation unit 8, such as a touch panel or a remote control, allows users to perform a key operation to input characters in the character input field 1 displayed by the character-input-field display processing unit 7. Keys for inputting Arabic alphabets (including a space) and keys for inputting Arabic numerals are assigned to operations keys of the operation unit 8 so that characters can be input in Arabic. When the operation unit 8 supports character input in non-Arabic languages, input keys for the non-Arabic languages may be assigned in response to input of an input language switch key.

The character-input display processing unit 10 recognizes the operation key of the operation unit 8 and displays a character corresponding to the operation of the operation unit 8 at a specified input position in the character input field 1. The input position is specified by the cursor display processing unit 11 with a cursor.

The character input apparatus 5 having such a configuration can receive input of an Arabic character string containing a mixture of Arabic alphabets and numerals in the character input field 1.

More specifically, the cursor display processing unit 11 displays, in the character input field 1, the cursor 2 indicating an input position of a next character in the character input field 1.

The display-position movement processing unit 12 can move the display position of the character input and displayed by the character-input display processing unit 10 as the character input progresses.

More specifically, when a user input Arabic alphabets in the character input field 1 in the left direction of FIGS. 1 and 2, the cursor display processing unit 11 moves the cursor 2 in the left direction in response to the progression of input of Arabic alphabets so that the cursor 2 indicates the input position of a next Arabic alphabet. In this way, the character input apparatus 5 can perform processing, such as step 1 (ST1) to step 5 (ST5) in FIG. 1 and step 21 (ST21) to step 23 (ST23) in FIG. 2. When the character input apparatus 5 additionally supports character input in non-Arabic languages (e.g., English), the cursor display processing unit 11 may set the display position of the cursor 2 in the initial state illustrated in step 1 (ST1) in FIG. 1 once an input language mode is set to Arabic in the character input apparatus 5 through an operation of the operation unit 8.

After the cursor 2 is moved to the left end display position of the character input field 1 in the process of moving the cursor 2 in the left direction in response to the progression of input of Arabic Alphabets, the cursor display processing unit 11 fixes the position of the cursor 2 regardless of the progression of input of Arabic alphabets. At this time, the display-position movement processing unit 12 moves the display position of each of the Arabic alphabets input before the latest one in the right direction as input of the Arabic alphabets progresses. In this way, the character input apparatus 5 can perform processing, such as step 4 (ST4) and step 5 (ST5) in FIG. 1.

When the Arabic-alphabet input mode is switched into input of numerals that are written toward the left direction in FIGS. 1 and 2 at the left end input position of the character input field 1, the cursor display processing unit 11 moves the cursor 2 in the right direction in response to progression of input of numerals so that the cursor 2 indicates the input position of a next numeral. At this time, the display-position movement processing unit 12 performs the first display-position movement processing to move the display position of each of the characters input before the switching in the right direction in response to the progression of input of numerals with the display position of each of the numerals input after the switching being fixed. In the first display-position movement processing, the display position of each alphabet input before the switching is moved by an amount equivalent to the number of input numerals. Additionally, at this time, the display-position movement processing unit 12 hides the alphabet overflowing from the character input field 1 as a result of the first display-position movement processing. In this way, the character input apparatus 5 can perform processing, such as step 6' (ST6') to step 9' (ST9') in FIG. 1.

In contrast, when the Arabic-alphabet input mode is switched into the numeral input mode at an input position other than the left end input position of the character input field 1, the cursor display processing unit 11 fixes the display position of the cursor 2 regardless of the progression of input of numerals. At this time, the display-position movement processing unit 12 performs the second display-position movement processing to move the display position of each of the numerals input earlier after the switching in the left direction in response to the progression of input of numerals with the display position of each of the alphabets input before the switching being fixed. In this way, the character input apparatus 5 can perform processing, such as step 24 (ST24) to step 26 (ST26) in FIG. 2.

If the numeral that is input at the time of the switching is moved to the left end display position of the character input field 1 in process of performing such second display-position movement processing, the cursor display processing unit 11 moves the cursor 2 in the right direction and the display-position movement processing unit 12 performs the first display-position movement processing as input of numerals further progresses. At this time, the display-position movement processing unit 12 hides the alphabet overflowing from the character input field 1 as a result of the first display-position movement processing. In this way, the character input apparatus 5 can perform processing, such as step 27 (ST27) and step 28 (ST28) in FIG. 2.

When a latest numeral input after the switching is moved to the right end display position of the character input field 1 in process of moving the cursor 2 in the right direction and performing the first display-position movement processing (which is not necessarily performed after the second display-position movement processing), the cursor display processing unit 11 fixes the display position of the cursor 2 thereafter regardless of the progression of input of numerals. At this time, the display-position movement processing unit 12 performs the second display-position movement processing. In this way, the character input apparatus 5 can perform processing, such as step 30 (ST30) and step 31 (ST31) in FIG. 2.

When the input mode is again switched into the Arabic-alphabet input mode after the switching, the cursor display processing unit 11 moves the display position of the cursor 2 to a position indicating an input position of an Arabic alphabet following the one input at the time of switching. In this way, the character input apparatus 5 can perform processing, such as step 10 (ST10) in FIG. 1.

Each of the processing units 7 and 10 to 12 of the character input apparatus 5 can be constituted by a CPU that loads and executes a program for realizing functions of each of the processing units 7 and 10 to 12 stored in a storage unit, such as a read-only memory (ROM), from the storage unit. Additionally, the character input apparatus 5 may use a storage unit, such as a random access memory (RAM) to temporarily store data for use in processing of each of the processing unit 7 and 10 to 12 and to store processing results.

In addition, the character input apparatus 5 may be included in in-vehicle devices. In this case, input of a character string can be used in inputting an address for a destination search in a car-navigation function, edition of a phonebook in a handsfree function, and edition of a title of a song in an audio playback function.

As described above, the disclosed embodiments allow users to confirm a character input immediately before the latest one when the users input an Arabic character string and, thus, can prevent input mistakes from being overlooked.

The present invention should not be limited to the foregoing embodiments and can be variously altered within a scope not departing from the features of the present invention.

For example, the present invention is advantageously applied to input of a character string in non-Arabic languages (e.g., Persian) as long as the character string is in a language in which characters are written in opposite directions depending of types of the characters. However, depending on a concept, the present invention may be applied to, for example, a case where a Latin proper noun is included in an Arabic character string by treating the Latin noun like numerals in Arabic.

Although the display position of the cursor matches the input position (i.e., the display position) of the character in the character input field 1 in the foregoing embodiments, the present invention should not be limited to such an example and the cursor may be displayed in front of (at character spacing) the input position of the next character as long as the cursor can indicate the input position of the next character.

Furthermore, even when the Arabic-alphabet input mode is switched into the numeral input mode at an input position other than the left end of the character input field 1, the cursor 2 may be moved in the right direction from the input position and the first display-position movement processing may be started in response to progression of input of numerals. It is therefore intended that the foregoing detailed description be regarded as illustrative rather than limiting, and that it be understood that it is the following claims, including all equivalents, that are intended to define the spirit and scope of this invention.

What is claimed is:

1. A cursor display method for inputting a character string in a character input area capable of receiving input of characters and displaying a limited number of input characters, the character string comprising a mixture of a first-type character having a first writing direction and a second-type character having a second writing direction, the cursor display method comprising:

moving a displayed cursor indicating an input position of a next character in the character input area in a first character input direction corresponding to the first writing direction when the first-type character is input in the character input area in the first character input direction, the cursor being moved in response to progression of input of first-type characters to indicate the input position of the next first-type character; and moving the displayed cursor in a second character input direction opposite to the first character input direction and performing first display-position movement processing when input of the first-type character is switched into input of the second-type character written in the second character input direction, the displayed cursor being moved in response to progression of input of second-type characters to indicate the input position of the next second-type character, the first display-position movement processing being performed so that a display position of each character input before the switching is moved in the second character input direction in response to the progression of input of second-type characters with a display position of the second-type character input after the switching being fixed.

2. The cursor display method of claim 1, wherein the first display-position movement processing comprises hiding a character overflowing from the character input area as a result of the first display-position movement processing.

3. The cursor display method of claim 1, wherein the display position of each character input before the switching is moved in the first display-position movement processing by an amount equivalent to the number of input second-type characters.

4. The cursor display method of claim 1, wherein the displayed cursor is moved in the second character input direction and the first display-position movement processing is performed when the switching is performed at an end input position of the character input area in the first character input direction, and wherein, when the switching is performed at an input position other than the end input position, the display position of the cursor is fixed regardless of the progression of input of second-type characters and second display-position movement processing is performed so that the display position of the second-type character input earlier after the switching is moved in the first character input direction in response to the progression of input of second-type characters with the display position of the first-type character input before the switching being fixed.

5. The cursor display method of claim 4, wherein the displayed cursor is moved in the second character input direction and the first display-position movement processing is performed in response to the progression of input of second-type characters after the second-type character input at the time of the switching is moved to an end display position of the character input area in the first character input direction in process of performing the second display-position movement processing.

6. The cursor display method of claim 1, wherein, when a latest second-type character input after the switching is displayed at an end display position of the character input area in the second character input direction in the process of moving the displayed cursor in the second character input direction and performing the first display-position movement processing, the display position of the cursor is fixed thereafter regardless of the progression of input of second-type characters and the second display-position movement processing is performed so that the display position of the second-type character input earlier after the switching is moved in the first character input direction in response to the progression of input of second-type characters.

7. The cursor display method of claim 1, wherein, when input of the second-type character is again switched into input of the first-type character after the switching, the displayed cursor is moved at a display position indicating an input position of a first-type character following the one input at the time of the last switching.

8. The cursor display method of claim 1, wherein the character string is in a predetermined language in which characters are written in opposite directions depending on types of the characters.

9. The cursor display method of claim 8, wherein Arabic serves as the predetermined language and an alphabet and a numeral in Arabic correspond to the first-type character and the second-type character, respectively.

10. A character input apparatus capable of inputting a character string in a character input area, the character string comprising a mixture of a first-type character having a first writing direction and a second-type character having a second writing direction opposite to the first writing direction, the character input apparatus comprising:
   a display unit;
   a character-input-area display processing device configured to display the character input area on the display unit, the character input area being capable of receiving input of characters and displaying a limited number of input characters;
   an operation device capable of receiving an operation for inputting a character in the character input area displayed by the character-input-area display processing device;
   a character-input display processing device configured to input and display a character corresponding to the operation of the operation device in the character input area;
   a cursor display processing device configured to display a cursor in the character input area, the cursor indicating an input position of a next character in the character input area; and
   a display-position movement processing device capable of moving a display position of the character input and displayed by the character-input display processing device in response to progression of input of characters,
   wherein,
      when the first-type character is input in the character input area in a first character input direction corresponding to the first writing direction, the cursor display processing device moves the displayed cursor in the first character input direction in response to progression of input of first-type characters so that the cursor indicates the input position of the next first-type character, and,
      when input of the first-type character is switched into input of the second-type character written in a second character input direction opposite to the first character input direction, the cursor display processing device moves the displayed cursor in the second character input direction in response to progression of input of second-type characters so that the cursor indicates the input position of the next second-type character, and
   wherein the display-position movement processing device performs first display-position movement processing when the displayed cursor is moved in the second character input direction so that a display position of each character input before the switching is moved in the second character input direction in response to the progression of input of second-type characters with the display position of the second-type character input after the switching being fixed.

11. The character input apparatus of claim 10, wherein the first display-position movement processing comprises hiding a character overflowing from the character input area as a result of the first display-position movement processing.

12. The character input apparatus of claim 10, wherein the display position of each character input before the switching is moved in the first display-position movement processing by an amount equivalent to the number of input second-type characters.

13. The character input apparatus of claim 10, wherein the cursor display processing device moves the displayed cursor in the second character input direction and the display-position movement processing device performs the first display-position movement processing when the switching is performed at an end input position of the character input area in the first character input direction, and
   wherein, when the switching is performed at an input position other than the end input position, the cursor display processing device fixes the display position of the cursor regardless of the progression of input of second-type characters and the display-position movement processing device performs second display-position movement processing so that the display position of the second-type character input earlier after the switching is moved in the first character input direction in response to the progression of input of second-type characters with the display position of the character input before the switching being fixed.

14. The character input apparatus of claim 13, wherein the cursor display processing device moves the displayed cursor in the second character input direction and the display-position movement processing device performs the first display-position movement processing in response to the progression of input of second-type characters after the second-type character input at the time of the switching is moved to an end display position of the character input area in the first character input direction in process of performing the second display-position movement processing.

15. The character input apparatus of claim 10, wherein, when a latest second-type character input after the switching is displayed at an end display position of the character input area in the second character input direction in process of moving the displayed cursor in the second character input direction and performing the first display-position movement processing, the cursor display processing device fixes the display position of the cursor thereafter regardless of the progression of input of second-type characters and the display-position movement processing device performs the second display-position movement processing so that the display position of the second-type character input earlier after the switching is moved in the first character input direction in response to the progression of input of second-type characters.

16. The character input apparatus of claim 10, wherein, when input of the second-type character is again switched into input of the first-type character after the switching, the cursor display processing device moves the displayed cursor to a display position indicating an input position of a first-type character following the one input at the time of the last switching.

17. The character input apparatus of claim 10, wherein the character string is in a predetermined language in which characters are written in opposite directions depending on types of the characters.

18. The character input apparatus of claim 17, wherein the predetermined language includes Arabic and the first-type character and the second-type character correspond to an alphabet and a numeral in Arabic, respectively, when the predetermined language is Arabic.

* * * * *